(No Model.)
A. SCHULTZE.
EYEGLASSES.
No. 384,475. Patented June 12, 1888.
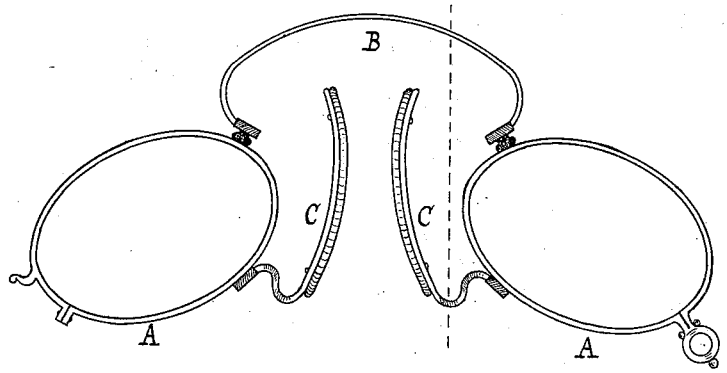
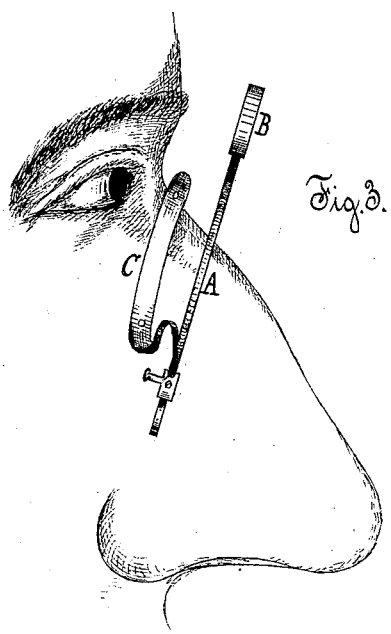
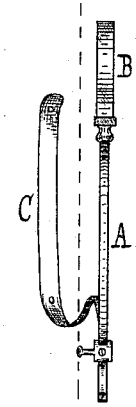
Witnesses:
Frank H. Hyatt
Edmund D. Hennessy
Inventor:
Augusta Schultze,
by her Attorney,
Rollin M. Morgan

UNITED STATES PATENT OFFICE.

AUGUSTA SCHULTZE, OF NEW YORK, N. Y.

EYEGLASSES.

SPECIFICATION forming part of Letters Patent No. 384,475, dated June 12, 1888.

Application filed May 10, 1887. Serial No. 237,712. (No model.)

*To all whom it may concern:*

Be it known that I, AUGUSTA SCHULTZE, a citizen of the United States, and a resident of the city, county, and State of New York, have invented a certain new and useful Improvement in Nose-Pieces for Eyeglasses, of which the following is a specification in such full, clear, and exact terms as will enable any one skilled in the art to make and use the same, reference being had to the accompanying drawings, illustrating the written description, wherein like letters of reference indicate corresponding parts in the several views.

Figure 1 is a front view of my improved nose-pieces attached to the frames of ordinary eyeglasses; and Fig. 2 is a side view about on the section indicated by the dotted line in Fig. 1, while Fig. 3 is another side view showing clearly the situation of the nose-pieces and the relative position of the eyeglasses upon the nose.

The object of my invention is to provide eyeglasses which will fold together compactly for carrying conveniently, and when unfolded the nose-pieces of which shall automatically assume a desirable position in a plane nearer the eyes than the eyeglasses, thereby becoming more comfortable and avoiding moisture on the lenses from perspiration, the lower portions of said nose-pieces being perfectly elastic, with unattached and free upper ends, as more fully set forth below.

A A are ordinary eyeglass-frames, held together by an elastic bow, B, in the usual way.

C C are my improved nose-pieces, each consisting of a spring attached firmly on the lower part of the inside of the frame A, or it can be affixed by a screw, so that it may be adjusted and set in any preferred position. The spring C is bent and curved upward into the shape outlined most clearly in Fig. 1, and then inward from the bottom, as shown most clearly in Fig. 2, so that the nose-pieces do not lie in the same plane, but in different although nearly parallel planes, as shown. The spring is tempered to retain this normal shape and position, leaving the upper end the utmost freedom of adjustment and allowing the glasses to fold together compactly. Suitable cushions or pads are provided, as usual. The practical result of this peculiar shape and relation of the nose-pieces to the eyeglasses is, that the nose-pieces adjust themselves naturally above the bridge of the nose, the most suitable situation, and retain position easily and firmly, while the eyeglasses are conveniently distant from the eyes, very nearly like spectacles, and so not liable to moisture from the eyes.

What I claim as new, useful, and my invention is—

In eyeglasses, the combination of a flexible bow-spring and frames for lenses, with elastic nose-pieces attached at their lower ends to said frames, the bottom part of said nose-pieces being bent inward toward the eyes, the middle part being bent parallel, or nearly so, to the plane of the lenses, and the upper ends being unattached and freely movable, all substantially as specified.

Dated New York, April 29, 1887.

AUGUSTA SCHULTZE.

Witnesses:
FRANK H. HYATT,
JOHN J. CUNNIFF.